Nov. 2, 1943.  R. H. PACKARD  2,333,119
RADIO CONTROL DEVICE
Filed Aug. 1, 1940
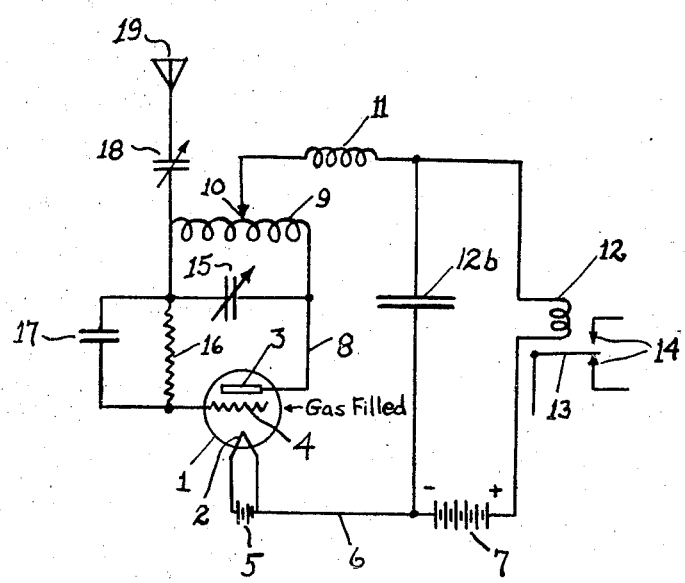
Robert H. Packard
Inventor
By Elmer J. Gorn
Attorney Patented Nov. 2, 1943

2,333,119

UNITED STATES PATENT OFFICE 2,333,119

RADIO CONTROL DEVICE

Robert H. Packard, Newton, Mass., assignor to Raytheon Production Corporation, Newton, Mass., a corporation of Delaware Application August 1, 1940, Serial No. 349,173

13 Claims. (Cl. 250—27)

This invention relates to an electrical space discharge tube circuit arrangement which may be utilized as a sensitive device for controlling relays and the like in response to high frequency radio signals.

An object of this invention is to devise such an arrangement which is extremely sensitive and which produces a large change in current in response to relatively weak signals.

Another object is to devise an arrangement which is simple and light in weight so that it may be used, for example, in remote control of model airplanes and the like.

A further object of this invention is to devise such an arrangement in which a simple gas filled electrical space discharge tube is utilized.

The foregoing and other objects of this invention will be best understood from the following description of an exemplification thereof, reference being had to the accompanying drawing wherein the figure is a diagrammatic representation of a circuit embodying my invention.

In the arrangement shown there is utilized an electrical space discharge tube 1. This tube is preferably a triode and is filled with an inert gas, preferably a mixture of krypton and xenon, at a pressure of the order of 1 to 100 microns. The pressure in a practical case was 30 microns. Although the tube is preferably a triode, additional control electrodes could be utilized if desired. As shown, the tube 1 contains a thermionic cathode 2, an anode 3 and a control grid 4.

For the purpose of heating the cathode, it is supplied with a suitable source of current such as a battery 5. One side of the cathode is connected through a lead 6 to the negative terminal of a source of direct current such as a battery 7. A lead 8 connects the anode 3 to one side of an inductance 9 provided with a tap 10 which is connected through a radio frequency choke 11, and the operating coil 12 of a control relay to the positive terminal of the battery 7. A condenser 12b is connected from the negative side of the battery 7 to the right end of the choke 11. The control relay may be provided with an armature 13 which is adapted to cooperate with a pair of control contacts 14 for any desired control.

Across the inductance 9 is connected a variable condenser 15 so that the inductance 9 and capacity 15 may be turned to the incoming radio signal. The side of the condenser 15 opposite the lead 8 is connected through a grid resistor 16 to the grid 4. Across the grid resistor 16 is connected a condenser 17. The side of the inductance 9 opposite the lead 8 is connected through a variable tuning condenser 18 to an antenna 19 which is adapted to receive the controlling radio frequency signal.

In a practical embodiment of the above system, the following values were used for the circuit element. The inductance 9 was made of nine spaced turns of a coil having an inner diameter of ⅜ inch. The condenser 15 was approximately ten micromicrofarads and variable, the condenser 17 was about one hundred micromicrofarads, the resistor 16 was about 1 to 10 megohms, the condenser 18 was about 3 to 15 micromicrofarads, the choke 11 was a five meter choke, and the condenser 12b was set at various values between .01 to 1 microfarad.

With the arrangement as shown, the voltage of the battery 7 is adjusted to a point above the break-down potential of the gas filling of the tube 1. In the practical case mentioned above, the proper voltage may lie within a range of about 30 to 50 volts. A decreased gas pressure may require higher voltages. When the voltage of the battery 7 is adjusted to the proper value, and a carrier radio signal is tuned into the antenna circuit, the anode current flowing through the coil 12 will decrease to a considerable degree so that it may be about ten per cent of the value flowing before the reception of the carrier wave. This difference in current can be readily made sufficient to actuate the armature 13 of the control relay.

In the example given above with the condenser 12b between .002 and .01 microfarad, in absence of the reception of the carrier and with phones substituted for the coil 12, the characteristic hiss of a super-regenerative receiver was present in the phones, but apparently several thousand times as loud. When the current was received, however, the hiss completely disappeared. In the case where the received signal was speech modulated, the speech could be heard although when the circuit was adjusted for optimum control conditions, the speech was distorted. By readjusting the circuit, however, the distortion was eliminated and the speech was received with volume sufficient to drive a loud speaker. With high vacuum tubes utilizing low plate voltage, of the order specified, under similar conditions speech would be barely audible in phones.

When the condenser 12b was between about .01 microfarad up to about 1 microfarad, relaxation oscillations were set up in the anode circuit at audible frequencies. The frequency of these relaxation oscillations was dependent upon the value of the capacity of the condenser 12b and the resistance and inductance of the coil 12 or of the phones substituted for said coil. The frequency was also dependent to a certain degree upon the plate voltage and the resultant bias on the grid 4. Under these conditions, upon the reception of a radio signal, the frequency of these relaxation oscillations was reduced to zero, probably as a result of the grid having been made more negative by the received signal. In cases where the received signal is very weak and under other conditions of variation of the plate voltage or the value of the grid leak resistor 16 from optimum control conditions, the relaxation oscillations were merely reduced in frequency with only a relatively slight decrease in the plate current. However, under the proper conditions, the audio frequency relaxation oscillations were completely stopped and the anode current dropped to less than 20 per cent of its value prior to the reception of the signal. Under these conditions, the tube continued to oscillate at the radio frequency of the received signal and at the quench or interruption frequency of the order of 10 to 100 kilocycles.

In accordance with my present understanding of the theory of operation of the above arrangement, the circuit operates as follows. Prior to the reception of the radio signal, the tube and its associated circuit is operating as a relaxation oscillator in which the anode voltage swings to values sufficiently great to initiate cumulative ionization between the cathode and the anode. However, the anode voltage will swing below the value at which cumulative ionization of the gas can be maintained for a considerable period of the relaxation frequency cycle. During this period of the cycle, therefore, the ionization in the gas is reduced to such a value that the control grid 4 can operate as a space charge control similar to its operation in a high vacuum tube. Due to this factor, the circuit, which under these conditions operates as a self-quenching super-regenerative receiver, will be oscillating at the quench or interruption frequency and the grid 4 will acquire a certain value of negative bias which, however, is insufficient to prevent the initiation of cumulative ionization in the tube when the anode voltage again rises to a sufficient value due to the operation of the circuit as a relaxation oscillator. However, upon the reception of a radio frequency signal, the negative bias on the grid 4 will be increased due to the reception of the radio signal and also due to the fact that the reception of this signal increases the frequency and magnitude of the quench or intermediate frequency at which the system is oscillating. This increase in negative bias on the grid is sufficient to prevent the voltage on the anode 3 from causing the gas filling to break down and to produce cumulative ionization. Under these conditions, therefore, the relaxation oscillations are stopped and the current through the coil 12 is reduced as pointed out above.

Of course it is to be understood that this invention is not limited to the particular details as described above as many equivalents will suggest themselves to those skilled in the art. It is accordingly desired that the appended claims be given a broad interpretation commensurate with the scope of the invention within the art.

What is claimed is:

1. A system comprising a gas-filled discharge tube including a cathode, an anode, and a control electrode, an anode circuit, a control electrode circuit, said circuits being coupled to feed energy therebetween to cause regeneration, means for generating a quench frequency voltage to periodically quench said regeneration, means for generating oscillations in said anode circuit, and means responsive to a signal to substantially decrease the amplitude of said oscillations.

2. A system comprising a gas-filled discharge tube including a cathode, an anode, and a control electrode, an anode circuit, a control electrode circuit, said circuits being coupled to feed energy therebetween to cause regeneration, means for generating a quench frequency voltage to periodically quench said regeneration, means for generating oscillations in said anode circuit, and a circuit adapted to build up a bias voltage in response to a signal for impressing a blocking voltage on said control electrode for substantially decreasing the amplitude of said oscillations.

3. A system comprising a gas-filled discharge tube including a cathode, an anode, and a control electrode, an anode circuit, a control electrode circuit, said circuits being coupled to feed energy therebetween to cause regeneration, means for generating a quench frequency voltage to periodically quench said regeneration, means for generating oscillations in said anode circuit, and means responsive to a signal to substantially change the magnitude of the current flowing in said anode circuit.

4. A system comprising a gas-filled discharge tube including a cathode, an anode, and a control electrode, an anode circuit, a control electrode circuit, said circuits being coupled to feed energy therebetween to cause regeneration, means for generating a quench frequency voltage to periodically quench said regeneration, means for generating oscillations in said anode circuit, and a circuit adapted to build up a bias voltage in response to a signal for impressing a blocking voltage on said control electrode for substantially changing the magnitude of the current flowing in said anode circuit.

5. A system comprising a gas-filled tube including a cathode, an anode and a control grid, a radio frequency oscillation circuit connected to said tube for causing said tube to generate high frequency oscillations, said circuit including a self-biasing grid circuit for periodically impressing a bias voltage on said grid sufficient to stop said high frequency oscillations at a quench frequency rate of a lower order of magnitude than that of said radio frequency, a source of voltage for said oscillation circuit, said source having associated therewith a condenser which together with said tube constitute a relaxation oscillation circuit for generating relaxation oscillations of a still lower order of frequency, and a signal circuit responsive to a signal for impressing a bias voltage on said grid sufficient to stop said relaxation oscillations but insufficient to stop said combined radio frequency and quench frequency oscillations.

6. A system comprising a gas-filled tube including a cathode, an anode and a control grid, a radio frequency oscillation circuit connected to said tube for causing said tube to generate radio frequency oscillations, said circuit including a self-biasing grid circuit for periodically impressing a bias voltage on said grid sufficient to stop said radio frequency oscillations at a quench frequency rate of a lower order of magnitude than that of said radio frequency, a source of voltage for said oscillation circuit, said source having associated therewith a condenser which together with said tube constitute a relaxation oscillation circuit for generating relaxation oscillations of a still lower order of frequency, and a signal circuit responsive to a radio frequency signal for impressing a bias voltage on said grid sufficient to stop said relaxation oscillations but insufficient to stop said combined radio frequency and quench frequency oscillations.

7. A system comprising a gas-filled tube including a cathode, an anode and a control grid, a radio frequency oscillation circuit connected to said tube for causing said tube to generate radio frequency oscillations, said circuit including a self-biasing grid circuit for periodically impressing a bias voltage on said grid sufficient to stop said radio frequency oscillations at a quench frequency rate of a lower order of magnitude than that of said radio frequency, a source of voltage for said oscillation circuit, said source having associated therewith a condenser which together with said tube constitute a relaxation oscillation circuit for generating relaxation oscillations of a still lower order of frequency, the peak amplitude of said relaxation oscillations being sufficient to produce ionization of the gas filling of said tube, and a signal circuit responsive to a radio frequency signal for impressing a bias voltage on said grid sufficient to stop said relaxation oscillations but insufficient to stop said combined radio frequency and quench frequency oscillations.

8. The method of operating a gas-filled discharge tube of the type including a cathode, an anode and a control grid, said method comprising causing said tube to operate as a self-quenching super-regenerative oscillator generating radio frequency oscillations interrupted at a quench frequency of a lower order of magnitude, simultaneously causing said tube to operate as a relaxation oscillator generating relaxation oscillations of a still lower order of frequency and supplying, in response to a radio frequency signal, a blocking voltage to said grid to substantially reduce the amplitude of said relaxation oscillations to a value where said relaxation oscillations are substantially terminated, while permitting said combined radio and quench frequencies to continue to be generated.

9. The method of operating a gas-filled discharge tube of the type including a cathode, an anode and a control grid, said method comprising causing said tube to operate as a self-quenching super-regenerative oscillator generating high frequency oscillations interrupted at a quench frequency of a lower order of magnitude, simultaneously causing said tube to operate as a relaxation oscillator generating relaxation oscillations of a still lower order of frequency and having a sufficient peak amplitude to produce ionization of the gas filling of said tube, and supplying, in response to a signal, a blocking voltage to said grid to substantially reduce the amplitude of said relaxation oscillations to a value where said ionization is substantially reduced and said relaxation oscillations substantially terminated, while permitting said combined radio and quench frequencies to continue to be generated.

10. The method of operating a gas-filled discharge tube of the type including a cathode, an anode and a control grid, said method comprising causing said tube to operate as a self-quenching super-regenerative oscillator generating radio frequency oscillations interrupted at a quench frequency of a lower order of magnitude, simultaneously causing said tube to operate as a relaxation oscillator generating relaxation oscillations of a still lower order of frequency and having a sufficient peak amplitude to produce ionization of the gas filling of said tube, and supplying, in response to a radio frequency signal, a blocking voltage to said grid to substantially reduce the amplitude of said relaxation oscillations to a value where said ionization is substantially reduced and said relaxation oscillations substantially terminated, while permitting said combined radio and quench frequencies to continue to be generated.

11. A system comprising a gas-filled tube including a cathode, an anode and a control grid, a condenser and inductance constituting a tuned high frequency circuit connected in series with said anode, said grid being coupled to said tuned circuit in series with a self-biasing condenser and resistance circuit, a source of voltage connected between said cathode and a point on said tuned circuit, whereby said system operates as a self-quenching super-regenerative oscillator, a condenser connected across said source in series with an impedance, whereby said system also operates as a relaxation oscillator and a high frequency signal-receiving circuit connected to said self-biasing circuit for impressing a blocking voltage on said grid in response to a high frequency signal.

12. A system comprising a gas-filled discharge tube including a cathode, an anode, and a control electrode, an anode circuit, a control electrode circuit, said circuits being coupled to feed energy therebetween to cause regeneration, means for generating a quench frequency voltage to periodically quench said regeneration, means for generating oscillations in said anode circuit, and means responsive to a signal to substantially change the amplitude of said oscillations.

13. A system comprising a gas-filled discharge tube including a cathode, an anode, and a control electrode, an anode circuit, a control electrode circuit, said circuits being coupled to feed energy therebetween to cause regeneration, means for generating a quench frequency voltage to periodically quench said regeneration, means for generating oscillations in said anode circuit, and a circuit adapted to build up a bias voltage in response to a signal for impressing a blocking voltage on said control electrode for substantially changing the amplitude of said oscillations.

ROBERT H. PACKARD.